Oct. 11, 1966    R. A. KUTASH    3,277,555
CLIP FLEXURAL PIVOT MANUFACTURING METHOD
Filed May 22, 1963
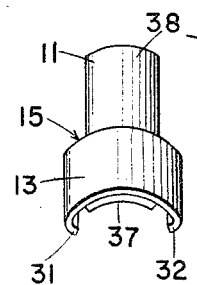
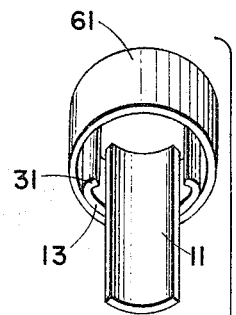
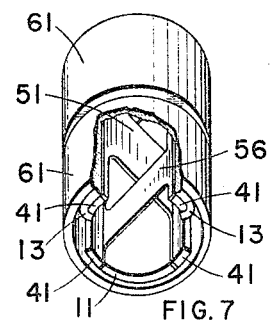
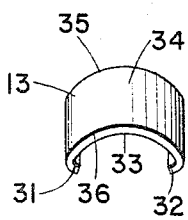
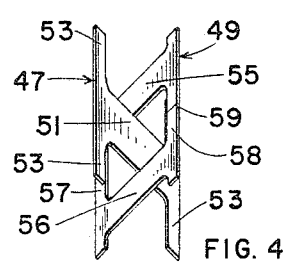
FIG. 7
FIG. 6
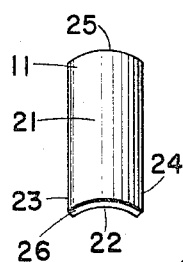
FIG. 4
FIG. 3
FIG. 5
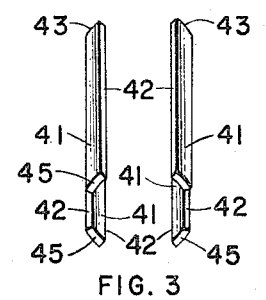
FIG. 1
FIG. 2
INVENTOR.
RICHARD A. KUTASH
BY
Robert W. Ely
ATTORNEY

United States Patent Office 3,277,555
Patented Oct. 11, 1966

3,277,555
CLIP FLEXURAL PIVOT MANUFACTURING METHOD
Richard A. Kutash, Yorkville, N.Y., assignor to The Bendix Corporation, Utica, N.Y., a corporation of Delaware
Filed May 22, 1963, Ser. No. 282,510
7 Claims. (Cl. 29—149.5)

This invention relates to flexural pivots and more particularly concerns the manufacturing of flexural pivots.

In prior methods of manufacturing flexural pivots which do not have the crossed leaf springs attached by screws, it was necessary to use relatively extensive machining operations. For example, the fabrication of the flexural pivot shown in the Humphrey U.S. Patent No. 2,931,092 requires the machining of four spring slots in a tube and, after unitizing, cutting the tube diametrically in an axial direction to give two spaced portions. Another flexural pivot which is shown in the Troeger U.S. Patent No. 3,073,584 discloses in the manufacture thereof the machining of spring slots, axially-extending travel openings, and reduced outer diameter surfaces and machining for cutting off ends. It is, of course, disadvantageous and expensive to use relatively extensive machining operations.

An object of the present invention is to provide a manufacturing method for flexural pivots which avoids extensive machining operations and provides less expensive fabrication.

Another object is the provision of a manufacturing method wherein spring slots or gaps and travel slots or openings result from the insertion assembly and the bonding of several parts.

A further object is to provide a method of manufacturing a flexural pivot from two arcuate clip members, reed-like arcuate elements, and leaf springs wherein, by insertion and bonding, the clip members are axially and diagonally spaced and connected via the reed-like elements to the springs in crossed relation.

An additional object is the provision of such a method of manufacture wherein sleeve-type, flexural pivots result by bonding a support tube or sleeve and a mounting tube or sleeve to the clip members either as an initial step or as a final step.

The realization of the above objects along with the features and advantages of the invention will be apparent from the following description and the accompanying drawing in which:

FIGURE 1 is a collected perspective view of an arcuate quadrant element, a wider arcuate clip member and an assembly thereof and shows the longer quadrant element inserted into and attached to the clip member to form an arcuate unit, FIGURE 2 is a collected perspective view of a quadrant element, a clip-like member, a tubular sleeve and an assembly thereof and shows insertion of the quadrant element and the clip-like member into the sleeve whereby with bonding, the assembly constitutes sleeve means having inner arcuate structure, FIGURE 3 is a perspective view of four wedges adapted to be inserted with a slip fit along the lips of the clip-like members for positioning crossed spring means, FIGURE 4 is a perspective view of perpendicular-arranged, crossed spring means and shows a wide spring and two narrower springs, FIGURE 5 is a plane end view of the assembly of two FIGURE 1 arcuate units, the FIGURE 4 spring means, and the FIGURE 3 wedges and shows a unitized dual-reed pivot having a clamping clip element at each end whereby the elements can be rotated relative to each other with flexing of the spring means, FIGURE 6 is a perspective end view of two of the FIGURE 2 sleeve means having inner arcuate structure or sub-assemblies and shows the projection of the quadrant of the back sleeve means into the front sleeve means and the gaps in the front sleeve means for the insertion of the spring means and wedges, and FIGURE 7 is a perspective view of unitized sleeved flexural pivot which results from the assembly of the FIGURE 5 dual-reed pivot with two FIGURE 2 tubular sleeves or from the assembly of the crossed-spring means, the wedges, and the FIGURE 6 arrangement.

Referring to FIGURE 1, the arcuate quadrant element 11 and arcuate clip 13 are shown to suggest assembly into the arcuate unit 15. The elongated, reed-like quadrant element 11 has a top surface 21, a bottom surface 22, two radial sides 23 and 24, and two ends 25 and 26. The arcuate clip or member 13 has two generally-radial, inwardly-projecting lips or edges 31 and 32, an inner surface 33, and an outer surface 34 both extending between ends 35 and 36. Quadrant elements 11 are made or provided by a coining operation and are plated with suitable brazing metal material. Clip members 13 are provided by stamping and are similarly plated. The outer surface 34 has a circumferential dimension which results from an included angle of about 145 degrees and is within the range of 120 to 170 degrees. The almost ninety-degree quadrant element 11 is slightly greater than twice as long as the clip member 13.

As the first assembly step in forming the dual-reed pivot of FIGURE 5, the quadrant element 11 is inserted and fitted on the center part of the inner surface 33 of clip member 13 with the front ends flush by means of a suitable fixture. The unitized arcuate unit 15 is formed by tack-welding or other bonding method. Two units 15 are made and have an arcuate base section 37 and an axially-projecting arcuate quadrant section 38. By reference to FIGURES 2 and 6, it is apparent how two of the units 15 are arranged in opposed relation on a common circle projection with the base sections 37 diagonal of each other so that the quadrant projecting sections 38 face each other and equal circumferential spacing is provided.

In FIGURES 3 and 4, the six other elements necessary to combine with the two FIGURE 1 arcuate units to give the FIGURE 5 dual-reed flexural pivot are shown and comprise four identical arcuate wedges 41 having lengthwise radial edges 42 and ends 43 and 45 and two leaf spring elements 47 and 49 both stamped from thin spring steel sheet and braze-plated. Wedges 41 are also plated and are coined-formed. Spring element 47 of I shape has a wide cross strip 51 and four axially-extending projections 53, two from each spring end. Spring element 49 of square O shape has two narrower cross strips 55 and 56 (equal in total width to strip 51) and axial strips 57 and 58 connecting the ends of the cross strips 55 and 56. The right axial strip 58 has a cut 59 therethrough for insertion of spring element 47. The springs 47 and 49 have a length equal to the diameter of the common circle of the clip members so that ends of the springs abut the inner surface of the clip members or are flush with outer surfaces of the quadrants and wedges.

As the next steps in the method of making the FIGURE 5 reed-like flexural pivot, the springs 47 and 49 are arranged perpendicularly as shown in FIGURE 4 or otherwise crossed and placed between the arcuate units 15 of FIGURE 1 with the ends of cross strips 51, 55 and 56 and the axial strips 57 and projections 53 abutting the edges of the quadrant elements 11 which accommodate the spring thickness. (Note internal structure of FIGURE 7 also.) After so positioning the springs 47 and 49 in crossed relation, the arcuate wedges 41 are inserted with a slip fit into the gaps between the ends of the springs and their axial strips 57 and projections 53 and the reversely-bent lips 31 and 32 of the clip members 13. It is to be noted that the inwardly-bent lips 31 and 32 are bent beyond radial planes so that they are at least slightly inclined toward each other or toward the clip inner surface. Finally, the two spring elements 47 and 49, the four wedges 41, the two quadrant elements 11 and the two clip members 13 are tackwelded and brazed together via the plated metal material in a furnace at all contacting surfaces or are otherwise bonded. Warpage or bowing of the springs, as occurred in some pivots made by prior methods, does not occur during heating and cooling since expansion is not restrained by single cylinder. The last operation gives the dual-reed flexural pivot as shown in FIGURE 5 which has the lips 31 and 32 bent into common planes to give maximum gripping or clamping on wedges 41 and the other structure.

The operation of the FIGURE 5 pivot is believed apparent. Thus, the front clip member 13 would have mounted thereon a device which is to be rotated, such as an instrument dial, and the bottom or rear clip member 13 would be held fixed in a support by suitable means, such as a screw. The dial actuator will cause limited rotation clockwise or counter-clockwise of the dial as limited by abutment between the circumferentially facing lips 31 and 32 of front and back clip members 13 and the projecting part of the wedges 41. As is well known, flexing of the crossed springs permits limited relative rotation of the clip members 13.

In many applications and with reference to FIGURE 7, it is desired that a flexural pivot be supported in a bore in a support member and that the limitedly-rotatable device be mounted by means of a hole therein. For these applications, two tubular sleeves 61 such as shown in FIGURE 2 are mounted on outer surfaces 34 of the clip members 13 of the FIGURE 5 pivot with the ends flush. Sleeves 61 have a length equal to the clip members 13 so that a small circumferential clearance for rotation without rubbing of the facing circular ends of the sleeves 61. Sleeves 61 are suitably attached as by brazing and/or tack welding so that the sleeves 61 are bonded to provide a form of tubular support means and tubular mounting means which are relatively rotatable. The resulting construction, after adding sleeves 61, is shown in FIGURE 7 and the operation thereof is believed apparent from the above operational description. It is to be noted that the clips 13 provide a radial spacing between sleeves 61 and the projecting arcuate structure formed by quadrants 11 and wedges 41.

Another method of fabricating the FIGURE 7 flexural pivot is shown by reference to FIGURES 2, 3, 4 and 6. Previously described parts are given the same reference numerals and will not be again described in the interest of brevity. The two halves forming the FIGURE 6 arrangement are formed (as suggested by FIGURE 2) by inserting the quadrant element 11 and clip member 13 into the tubular sleeve 61 with back edges flush and the quadrant element 11 projecting slightly more than twice the length of the equal-length sleeve 61 and clip member 13. The FIGURE 2 tubular-sleeved arcuate unit results from the step of tackwelding or otherwise bonding the parts. Two of these subassemblies are arranged in opposed relation as shown in FIGURE 6. The springs 47 and 49 and wedges 41 are inserted as previously described with the mechanical gripping provided by lips 31 and 32 and with all ends maintained flush and then the FIGURE 7 flexural pivot results by applying heat in a furnace to effect brazing of the coated parts without warpage of the spring elements.

It is to be understood that changes can be made in the disclosed method and parts by persons skilled in the art without departing from the invention as set forth in the appended claims.

What is claimed is:

1. The method of manufacturing a flexural pivot comprised of:
   forming two identical arcuate clip members each having two inwardly-projecting, axially-extending lips,
   each of said arcuate members having an inner surface between said lips and an outer surface, which has a circumferential dimension resulting from an included angle within the range of 120 to 170 degrees,
   providing two identical arcuate elements each having a length greater than twice the length of said arcuate members and adapted to mate with the center portion of the inner surface of said arcuate clip members,
   providing four identical arcuate wedges each having a length equal to each of said arcuate elements and adapted to mate with the inner surface of said arcuate clip members,
   said arcuate wedges each having a width equal to slightly less than half the difference between the width of the inner surface of one of said arcuate clip members and the width of one of said arcuate elements,
   providing thin leaf spring means adapted to be arranged in crossed relation,
   fitting one of said arcuate elements on the center part of the inner surface of each of said arcuate clip members and bonding the element to the respective arcuate clip member to form two arcuate units each having a base section including said outer surface and an axially-projecting arcuate section,
   arranging said arcuate units in opposed relation to each other on a common circle projection with the base sections diagonal of each other so that the projecting sections are diametrical of said base sections and so that the ends of the projections sections are flush with the ends of the opposite base sections,
   placing said leaf spring means in crossed relation between said arcuate units with the spring ends abutting the edges of said arcuate element and the inner surface of said arcuate clip member,
   inserting said arcuate wedges into the gaps between said spring ends and the lips of said arcuate clip members for contact therewith and to be flush with the ends of the respective arcuate units,
   bonding said leaf spring means and wedges to said arcuate units to provide a dual-reed flexural pivot having crossed spring means wherein one of said arcuate units can be rotated relative to the other with flexing of said spring means.

2. The method according to claim 1 and being further characterized by the step of:
   bonding tubular means to each base section to provide support tubular means and rotatable tubular mounting means for relative rotation with radial spacing of said tubular means from said wedges and arcuate elements to provide a sleeved flexural pivot.

3. The method according to claim 1 and being further characterized by the steps of:
   fitting a tubular sleeve on each of said clip members,
   bonding each sleeve at the time said element and said clip member are bonded to provide two sleeved subassemblies, and
   substituting said sub-assemblies for said arcuate units in the remaining steps whereby a sleeved flexural pivot results.

4. The method according to claim 1 and being further characterized by:
   the step of forming said clip members being done so that the inwardly-projecting lips are inclined slightly toward each other.

5. The method of manufacturing a sleeved flexural pivot comprised of:
   forming two identical arcuate clip members each having two generally-radial, inwardly-projecting, axially-extending lips,
   each of said arcuate members having an inner surface between said lips and an outer surface which has a circumferential dimension resulting from an included angle within the range of 120 to 170 degrees, providing two identical arcuate quadrant elements each having a length greater than twice the length of said arcuate members and adapted to mate with the inner surface of said arcuate clip members, providing four identical arcuate wedges each having a length equal to each of said arcuate quadrant elements, said arcuate wedges each having a width equal to slightly less than half the difference between the width of the inner surface of one of said arcuate clip members and the width of one of said arcuate quadrant elements, providing two thin flat spring elements having cross strips and axial strips extending from the ends of cross strips for extending between said clip members when arranged on a common projected circle, fitting one of said arcuate quadrant elements on the center part of the inner surface of each of said arcuate clip members and bonding the element to the respective arcuate clip member to form two arcuate units each having a base section including said outer surface and an axially-projecting arcuate quadrant section, arranging said arcuate units in opposed relation to each other on a common circle projection with the base sections diagonal of each other so that the projecting sections are diametrical of said base sections and so that the ends of the projecting sections are flush with the ends of the opposite base sections, placing said flat spring elements in perpendicularly cross relation between said arcuate units with the spring ends and axial strips abutting the edges of said quadrant elements and the inner surface of said arcuate clip member, inserting said arcuate wedges into the gaps between said spring ends and axial strips and the lips of said arcuate members for contact therewith and to be flush with the ends of the respective arcuate units, bonding said spring elements and wedges to said arcuate units to provide a structure having crossed springs wherein one of said arcuate units can be rotated relative to the other with flexing of said spring means and as limited by abutment between said lips and said projecting wedges, providing two identical tubular sleeves having a length equal to said clip members and formed to fit onto the outer surface of said base sections, fitting said sleeves on said clip members flush with the ends thereof whereby the facing sleeve ends are axially spaced, and bonding said tubular sleeves to each base section to provide a tubular support means and rotatable tubular mounting means for relative rotation with radial spacing of said sleeves from said wedges and arcuate elements.

6. The method according to claim 5 and being further characterized by:

the step of forming said clip members being done so that the inwardly-projecting lips are inclined slightly toward the inner surfaces of the clip members.

7. The method of making a sleeved flexural pivot comprised of:

providing a sleeve, an arcuate clip having inwardly-projecting gripping lips and an arcuate quadrant, coating said clip and said quadrant with bonding material, said clip having the same length as said sleeve and being fitted within said sleeve, said quadrant being longer than said sleeve to provide an extension and being fitted within said clip so that gaps of equal width are formed between the edges of said quadrant and said lips of said clip, tack-welding said sleeve, said clip, and said quadrant to form a first sub-assembly, forming a second sub-assembly substantially following the same steps as in making the first sub-assembly, providing four arcuate wedges for the gaps of said sub-assemblies and two thin flat spring elements for crossed spring connection between the sub-assemblies, coating said wedges and said spring elements with bonding material, arranging said sub-assemblies on a common axis so that adjacent sleeve ends are spaced and said extensions project to the respective ends of the sleeves of said sub-assemblies, arranging said spring elements in crossed relation with the ends thereof abutting diametrically the edges of said quadrants, positioning said wedges respectively in the recesses formed by said lips of said clips and the ends of said springs to form an assembly, and bonding the parts of said assembly by applying heat to form a sleeved flexural pivot.

References Cited by the Examiner
UNITED STATES PATENTS

| | | | |
|---|---|---|---|
| 2,931,092 | 4/1960 | Humphrey | 29—149.5 |
| 3,124,873 | 3/1964 | Troeger | 29—149.5 X |
| 3,142,888 | 8/1964 | Troeger | 29—149.5 |
| 3,181,851 | 5/1965 | Troeger | 267—1 |
| 3,181,918 | 5/1965 | Troeger | 267—1 X |

CHARLIE T. MOON, *Primary Examiner.*